United States Patent
Park et al.

(10) Patent No.: US 10,075,241 B2
(45) Date of Patent: *Sep. 11, 2018

(54) WIRELESS NETWORK SYSTEM, WIRELESS DEVICE, AND NETWORK REGISTRATION METHOD OF THE WIRELESS DEVICE

(71) Applicant: SAMSUNG ELECTRONICS CO., LTD., Suwon-si, Gyeonggi-do (KR)

(72) Inventors: Seong-man Park, Seoul (KR); Young-jun Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/828,027

(22) Filed: Nov. 30, 2017

(65) Prior Publication Data

US 2018/0091223 A1 Mar. 29, 2018

Related U.S. Application Data

(63) Continuation of application No. 15/176,496, filed on Jun. 8, 2016, now Pat. No. 9,838,122, which is a (Continued)

(30) Foreign Application Priority Data

Mar. 8, 2011 (KR) ........................ 10-2011-0020625

(51) Int. Cl.
*H04B 10/00* (2013.01)
*H04B 10/116* (2013.01)
(Continued)

(52) U.S. Cl.
CPC ....... *H04B 10/116* (2013.01); *H04B 10/1149* (2013.01); *H04W 48/16* (2013.01);
(Continued)

(58) Field of Classification Search
CPC . H04B 10/116; H04B 10/112; H04B 10/1123; H04B 10/114; H04B 10/1141;
(Continued)

(56) References Cited

U.S. PATENT DOCUMENTS 7,417,998 B2 8/2008 Lee
7,548,698 B2 6/2009 Yamamoto
(Continued)

FOREIGN PATENT DOCUMENTS

CN 101026413 8/2007
CN 101485154 7/2009
(Continued)

OTHER PUBLICATIONS

International Search Report and Written Opinion of the International Searching Authority dated Sep. 27, 2012 in corresponding International Patent Application No. PCT/KR2012/001663.
(Continued)

*Primary Examiner* — Hanh Phan
(74) *Attorney, Agent, or Firm* — Staas & Halsey LLP

(57) ABSTRACT

A method of registering a wireless device located in premises in a wireless network which is constructed in the premises. The method includes receiving a light signal, which includes network identification information of the wireless network constructed in the premises from at least one illumination device installed in the premises, and registering the wireless device in the wireless network constructed in the premises, by using the network identification information of the wireless network included in the received light signal.

8 Claims, 5 Drawing Sheets

Related U.S. Application Data continuation of application No. 14/660,486, filed on Mar. 17, 2015, now Pat. No. 9,374,160, which is a continuation of application No. 13/317,248, filed on Oct. 13, 2011, now Pat. No. 9,008,519.

(51) Int. Cl.
| | | |
|---|---|---|
| *H04B 10/114* | (2013.01) | |
| *H04W 48/16* | (2009.01) | |
| *H04W 60/00* | (2009.01) | |
| *H04W 60/04* | (2009.01) | |

(52) U.S. Cl.
CPC .......... *H04W 60/00* (2013.01); *H04W 60/04* (2013.01); *H05K 999/99* (2013.01)

(58) Field of Classification Search
CPC .......... H04B 10/1143; H04B 10/1149; H04W 48/16; H04W 60/04
USPC ........ 398/172, 118, 119, 127, 128, 130, 115, 398/135, 136, 182, 183, 202
See application file for complete search history.

(56) References Cited

U.S. PATENT DOCUMENTS

| | | | |
|---|---|---|---|
| 7,849,499 | B2 | 12/2010 | Gopalasetty et al. |
| 7,991,292 | B2 | 8/2011 | Takeshita et al. |
| 9,008,519 | B2 * | 4/2015 | Park .................. H04B 10/1149 398/118 |
| 9,838,122 | B2 * | 12/2017 | Park ..................... H04B 10/116 |
| 2006/0239689 | A1 | 10/2006 | Ashdown |
| 2007/0177161 | A1 | 8/2007 | Ishii |
| 2008/0199184 | A1 | 8/2008 | Takeshita et al. |
| 2008/0227463 | A1 | 9/2008 | Hizume |
| 2008/0304833 | A1 | 12/2008 | Zheng |
| 2009/0284366 | A1 | 11/2009 | Haartsen et al. |
| 2009/0297166 | A1 | 12/2009 | Nakagawa et al. |
| 2009/0310577 | A1 | 12/2009 | Kiribayashi |
| 2009/0310971 | A1 | 12/2009 | Kim et al. |
| 2009/0324248 | A1 | 12/2009 | Shiraki |
| 2010/0183308 | A1 | 7/2010 | Gerstel et al. |

FOREIGN PATENT DOCUMENTS

| | | |
|---|---|---|
| EP | 1959588 | 8/2008 |
| EP | 1990936 | 11/2008 |
| EP | 2043301 | 4/2009 |
| GB | 2424777 | 10/2006 |
| JP | 2002-232340 | 8/2002 |
| JP | 2005-318148 | 11/2005 |
| JP | 2006-339806 | 12/2006 |
| JP | 2007-235250 | 9/2007 |
| JP | 2008-35108 | 2/2008 |
| JP | 2008-199503 | 8/2008 |
| KR | 10-2006-0024947 | 3/2006 |
| KR | 10-2008-0101553 | 11/2008 |
| WO | 2005/086375 A1 | 9/2005 |
| WO | 2008/007514 A1 | 1/2008 |

OTHER PUBLICATIONS

Mexican Office Action dated Mar. 12, 2014 in corresponding Mexican Application No. MX/a/2013/006671.
Notice of Allowance dated Dec. 8, 2014 in related U.S. Appl. No. 13/317,248 (5 pages).
Non-final Office Action dated Jul. 16, 2014 in related U.S. Appl. No. 13/317,248 (6 pages).
Chinese Office Action dated Sep. 17, 2015 in corresponding Chinese Patent Application No. 201210033228.1.
Canadian Office Action dated Aug. 25, 2015 in corresponding Canadian Patent Application No. 2,824,968.
Canadian Office Action dated Apr. 12, 2016 in corresponding Canadian Patent Application No. 2,824,968.
Japanese Office Action dated Feb. 12, 2016 in corresponding Japanese Patent Application No. 2013-557646.
Extended European Search Report dated Apr. 20, 2012 issued in corresponding European Patent Application No. 12157998.1.
U.S. Office Action dated Apr. 23, 2015 from related U.S. Appl. No. 14/660,486.
U.S. Office Action dated Dec. 2, 2015 from related U.S. Appl. No. 14/660,486.
U.S. Notice of Allowance dated Feb. 22, 2016 from related U.S. Appl. No. 14/660,486.
Korean Office Action dated Jun. 29, 2017 in related Korean Application No. 10-2011-0020625.
Japanese Office Action dated Oct. 4, 2016 from Japanese Patent Application No. 2013-557646, 12 pages.
U.S. Office Action dated Jul. 29, 2016 in co-pending U.S. Appl. No. 15/176,496.
U.S. Office Action dated Apr. 20, 2017 in co-pending U.S. Appl. No. 15/176,496.
U.S. Notice of Allowance dated Aug. 1, 2017 in co-pending U.S. Appl. No. 15/176,496.
U.S. Notice of Allowance dated Oct. 11, 2017 in co-pending U.S. Appl. No. 15/176,496.
U.S. Appl. No. 15/176,496, filed Jun. 8, 2016, Seong-man Park, Samsung Electronics Co., Ltd.
Office Action dated Dec. 16, 2017 in corresponding Korean Patent Application No. 10-2011-0020625, 6 pgs.
Office Action dated May 8, 2018, in corresponding Japanese Patent Application No. 2017-127717, 5 pgs.
Office Action dated Apr. 6, 2018, in corresponding Republic of Korea Patent Application No. 10-2018-0003461, 7 pgs.

* cited by examiner

WIRELESS NETWORK SYSTEM, WIRELESS DEVICE, AND NETWORK REGISTRATION METHOD OF THE WIRELESS DEVICE

CROSS-REFERENCE TO RELATED APPLICATIONS

This application is a continuation of U.S. application Ser. No. 15/176,496, filed on Jun. 8, 2016 and now issued as U.S. Pat. No. 9,838,122, which is a continuation of U.S. application Ser. No. 14/660,486, filed on Mar. 17, 2015 and now issued as U.S. Pat. No. 9,374,160, which is a continuation of U.S. application Ser. No. 13/317,248, filed on Oct. 13, 2011 and now issued as U.S. Pat. No. 9,008,519, which claims the benefit of Korean Patent Application No. 10-2011-0020625, filed on Mar. 8, 2011, in the Korean Intellectual Property Office, the disclosures of which are incorporated herein in their entirety by reference.

BACKGROUND

1. Field

The present disclosure relates to a method of registering a wireless device in a wireless network, and a wireless network system and the wireless device for implementing the method.

2. Description of the Related Art

Wireless networks are becoming increasingly important, and also have a variety of applications. Particularly, as technologies related to a wireless personal area network (WPAN) and a wireless sensor network (WSN) are developing, research into construction of a home network for automatically collecting and integratedly managing premises information is being actively conducted. To construct such a home network, various home electronic appliances need to be connected to a network and managed integratedly. Accordingly, it is necessary to develop a method of registering various devices in a wireless network and a method of managing the connected devices.

SUMMARY

The present disclosure provides a wireless network system for registering a wireless device in a wireless network by using an illumination device installed in premises without performing any additional registration procedure, the wireless device, and a method of registering the wireless device in the wireless network.

According to an aspect of the present disclosure, there is provided a method of registering a wireless device located in premises in a wireless network which is constructed in the premises, the method including receiving a light signal, which includes network identification information of the wireless network constructed in the premises, from at least one illumination device installed in the premises; and registering the wireless device in the wireless network constructed in the premises, by using the network identification information included in the received light signal.

The method may further include scanning at least one wireless network which is usable at a current location of the wireless device. The registering of the wireless device at the wireless network may include registering the wireless device in a wireless network, which corresponds to the network identification information included in the received light signal, from among the scanned networks.

The received light signal may further include location information of the illumination device transmitting the light signal. If the registering of the wireless device in the wireless network is completed, the wireless device transmits the location information included in the light signal to the wireless network.

The receiving of the light signal may further include sending a request for a light signal to at least one illumination device installed in the premises and, according to the request for a light signal, receiving the light signal transmitted from the illumination device.

According to another aspect of the present disclosure, there is provided a wireless device to be registered in a wireless network which is constructed in premises, the wireless device including a light receiving unit to receive a light signal transmitted from at least one illumination device installed in the premises; a light signal interpretation unit to obtain network identification information of the wireless network constructed in the premises by interpreting the received light signal; and a wireless communication unit to register the wireless device in the wireless network constructed in the premises, by using the network identification information obtained by the light signal interpretation unit.

The wireless device may further include a network scanning unit to scan at least one wireless network which is usable at a current location of the wireless device. The wireless communication unit may register the wireless device in the wireless network, which corresponds to the network identification information obtained from the light signal interpretation unit, from among wireless networks scanned by the network scanning unit.

The light signal interpretation unit may obtain location information of an illumination device which has transmitted the light signal, by interpreting the received light signal. The wireless communication unit may transmit location information of the illumination device to the wireless network in which the wireless device is registered.

The wireless communication unit may request a light signal to at least one illumination device installed in the premises.

According to another aspect of the present disclosure, there is provided an illumination device installed in premises, the illumination device including a light generation unit to generate light; and a control unit to adjust brightness of the light by controlling the generation of light by the light generation unit. The control unit may control an ON and OFF status of the light by using a pattern which indicates network identification information of a wireless network constructed in the premises.

ON and OFF frequencies of the light may be equal to or higher than a blinking frequency that may not be perceived by a user.

The illumination device may further include a communication unit for receiving network identification information of the wireless network from outside.

According to another aspect of the present disclosure, there is provided a wireless network system constructed in premises, the wireless network system including an illumination device installed in the premises, to transmit a light signal including network identification information of a wireless network constructed in the premises; a gateway to receive a request for registration from a wireless device which has received the light signal; and a server to allow registration of the wireless device according to the request for registration.

The light signal may further include location information of the illumination device that has transmitted the light signal. The server may receive location information of the illumination device from the wireless device which is allowed to be registered, and store the received location information as location information of the wireless device.

The server may transmit network identification information of the wireless network, constructed in the premises, to at least one illumination device installed in the premises.

If the wireless device requests a light signal, the illumination device may transmit a light signal.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION

Exemplary embodiments of the present disclosure will now be described more fully with reference to the accompanying drawings. In the following description, functions or constructions well known to those of ordinary skill in the art will not be described in detail if it is determined that they would obscure the disclosure due to unnecessary detail.

Figure 1:
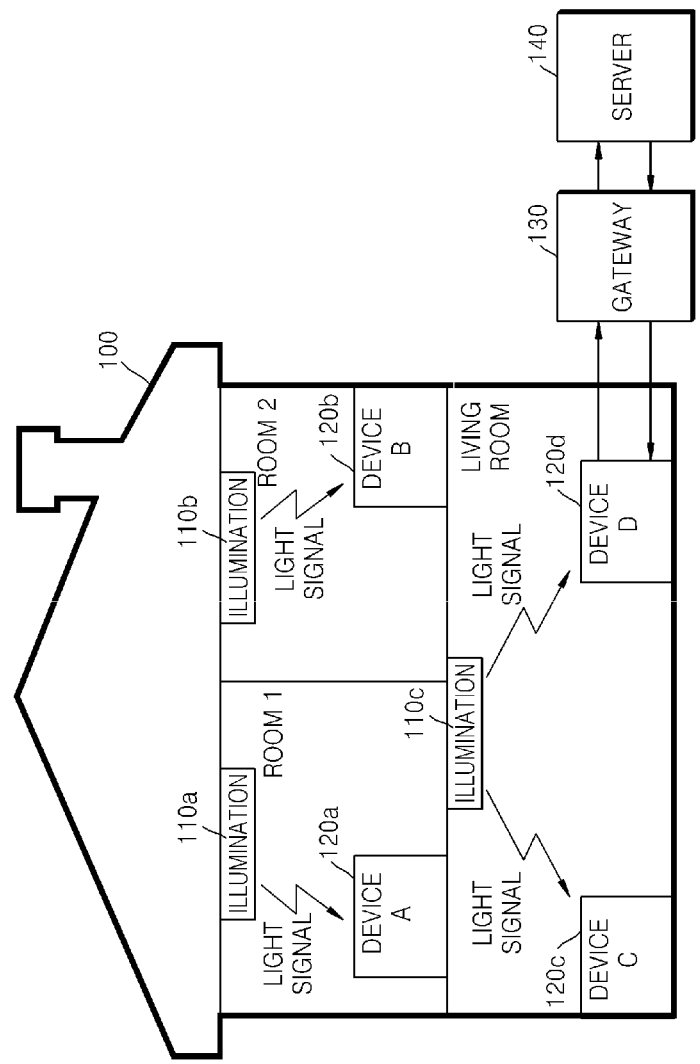
FIG. 1 illustrates a wireless network system, according to an embodiment of the present disclosure.

FIG. 1 illustrates a wireless network system, according to an embodiment of the present disclosure. Referring to FIG. 1, the wireless network system according to the present embodiment may include a plurality of illumination devices 110a, 110b, and 110c installed in premises 100, a gateway 130, and a server 140.

The illumination devices 110a, 110b, and 110c installed in the premises 100 may transmit a light signal including information to wireless devices 120a, 120b, 120c, and 120d that are to be registered in a wireless network. The information included in the light signal may be network identification information for identifying the wireless network or the network identification information and location information regarding locations of the illumination devices 110a, 110b, and 110c. Since the light signal including the network identification information and the location information is transmitted to the wireless devices 120a, 120b, 120c, and 120d by using the illumination devices 110a, 110b, and 110c installed in the premises 100, a previously constructed infrastructure may be utilized without an additional unit to transmit the light signal. Furthermore, even if the light signal is transmitted via the illumination devices 110a, 110b, and 110c, the illumination devices 110a, 110b, and 110c have no problem performing general illumination device functions, which will be described with reference to FIG. 2 later.

Although the gateway 130 and the server 140 that are constituent elements used to construct the wireless network are located outside the premises 100 in FIG. 1, the gateway 130 and the server 140 may be located in the premises 100 to construct and manage the wireless network.

The wireless devices 120a, 120b, and 120c that are to be connected to the wireless network may be installed and operate at different locations within the premises 100. The wireless devices 120a, 120b, and 120c installed at different locations within the premises 100 receive light signals at the corresponding locations. Then, the wireless devices 120a, 120b, and 120c may be registered in the wireless network by using information included in the received light signals, or may transmit location information to the wireless network.

For example, a process of newly installing a wireless device D 120d in a living room and registering the wireless device D 120d in the wireless network is described below. If power is applied to the wireless device D 120d, the wireless device D 120d scans to determine whether there is a connectible wireless network, and receives a light signal which is transmitted from the illumination device 110c located in the living room. After receiving the light signal, the wireless device D 120d interprets the received light signal to obtain network identification information included in the light signal and location information of the illumination device 110c. The network identification information may be a personal area network (PAN) ID to identify the corresponding wireless network. The location information of the illumination device 110c may be information regarding a location of the corresponding illumination device, such as the "living room" in the case of the illumination device 110c located in the living room. The wireless device D 120d tries to register in a wireless network which corresponds to the network identification information included in the received light signal. Upon completion of the registration, the wireless device D 120d may transmit the location information included in the received light signal, such as the "living room", to the connected wireless network. Specifically, if the device D 120d transmits a registration request to the gateway 130 of the wireless network which is determined by the network identification information, the gateway 130 allocates an address to the wireless device D 120d and completes the registration of the wireless device D 120d to the wireless network. That is, without performing an additional registration procedure, the wireless device D 120d automatically recognizes the wireless network in which the device D 120d is to be registered, and tries to register in the wireless network, thereby completing the registration. Furthermore, if the registration is completed, the wireless device D 120d may transmit the location information ("living room") included in the received light signal to the gateway 130, the gateway 130 may transmit the location information to the server 140, and the server 140 may store the location information as location information regarding the device D 120d.

As described above, the light signal including the network identification information and the location information is transmitted to the wireless devices 120a, 120b, 120c, and 120d, by using the previously constructed illumination devices 110a, 110b, and 110c in the premise 100. The wireless devices 120a, 120b, 120c, and 120d that received the light signal are registered in the wireless network by using the network identification information included in the received light signal and transmit the location information to the wireless network. Accordingly, it is possible to register the wireless devices 120a, 120b, 120c, and 120d in the wireless network by applying power to the wireless devices 120a, 120b, 120c, and 120d without having to take an additional registration procedure. Such a wireless network system may facilitate the registration of devices in a wireless network and be highly utilized by a smart grid system requiring location information of each device connected to the wireless network. Furthermore, the wireless network system may employ a ZigBee method, the ZigBee method being a communication protocol based on the IEEE 802 standard for personal area networks, as a communication method to implement the wireless network, considering the characteristics of a home network which must frequently receive a small amount of data from wireless devices. However, the present disclosure is not limited thereto, and a different type of home network system or a different wireless communication method may be applied.

Figure 2:
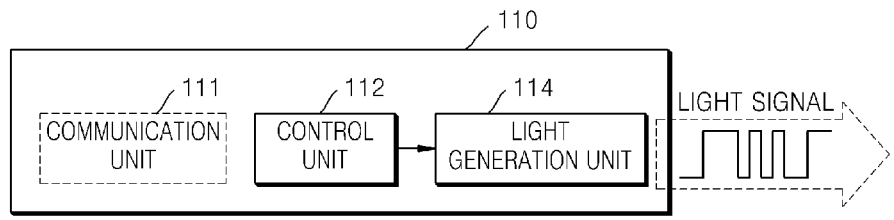
FIG. 2 is a block diagram of an illumination device to transmit a light signal in a wireless network system, according to an embodiment of the present disclosure.

FIG. 2 is a block diagram of an illumination device 110 to transmit a light signal in a wireless network system, according to an embodiment of the present disclosure. Referring to FIG. 2, the illumination device 110 to transmit the light signal in the wireless network system according to the present embodiment may include a control unit 112 and a light generation unit 114.

The control unit 112 controls generation of a light signal including predetermined data. The control unit 112 may be implemented as a switched-mode power supply (SMPS) for supplying power to the light generation unit 114. Specifically, the control unit 112 controls an On or Off status of light generated by the light generation unit 114 to have a certain frequency, thereby controlling brightness of the light, and at the same time, generating light in a pattern indicating network identification information of a wireless network. In this regard, the control unit 112 controls On and Off frequencies of the light at high frequencies that a user may not perceive so that the illumination device 110 can perform a general illumination device function. If it is assumed that the illumination device 110 of the present embodiment is a light emitting diode (LED) illumination device capable of dimming control, the control unit 112 controls dimming of the LED illumination device so that the light generation unit 114 generates light having a certain pattern. That is, the light generation unit 114 generates patterned light including network identification information for identifying a wireless network and location information regarding a location of the LED illumination device. Since the control unit 112 controls dimming at a frequency of 200 Hz or higher at which people may not perceive blinking of the illumination, the LED illumination device transmits a light signal including specific information while performing a general illumination device function. In addition, it is also possible for the control unit 112 to adjust illumination to a desired brightness, while transmitting the light signal including specific information through dimming control.

As illustrated in FIG. 2, the illumination device 110 to transmit the light signal in the wireless network system of the present embodiment may further include a communication unit 111. The communication unit 111 receives network identification information of the wireless network constructed in premises from a server of the wireless network system and outputs the network identification information to the control unit 112, and thus, the control unit 112 may control the light generation unit 114 to generate a light signal including the network identification information of the wireless network constructed in the premises.

Figure 3:
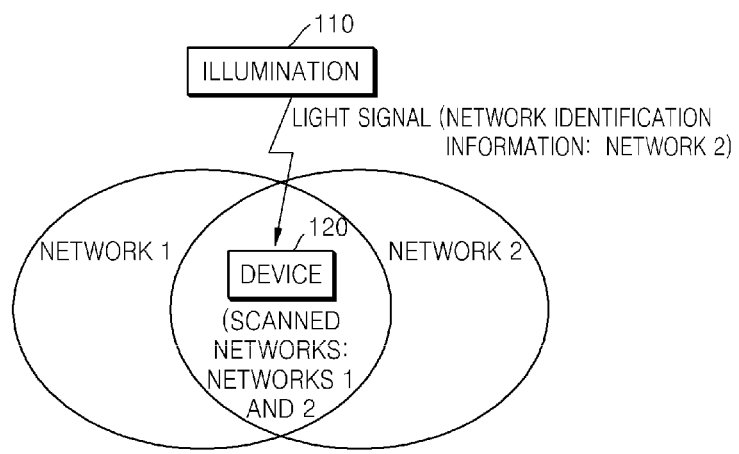
FIG. 3 illustrates a status of a wireless device placed in a location where it is connectible to two or more networks, according to an embodiment of the present disclosure.

FIG. 3 illustrates a status of a wireless device placed in a location where it is connectible to 2 or more wireless networks, according to an embodiment of the present disclosure. Referring to FIG. 3, a wireless device 120 is placed in the location where the wireless device 120 is connectible to 2 wireless networks, i.e. networks 1 and 2. Accordingly, if the wireless device 120 scans the connectible networks, both the networks 1 and 2 are scanned. However, if it is assumed that the wireless device 120 is to be connected to the network 2, the wireless device 120 must transmit a request for registration by specifying the network 2. However, if information about a network to which the wireless device 120 is to be registered is not stored, a user must designate the network 2 manually. According to the present embodiment, the wireless device 120 may designate the network 2 from among found networks (the networks 1 and 2) and request registration, by receiving and interpreting a light signal including network identification information regarding the network 2 in which the wireless device is to be registered. Since a network to be registered is designated by using the network identification information included in the light signal, the user does not need to designate a network manually. In addition, even when the wireless device 120 is placed in a location where it is connectible to several networks simultaneously, the wireless device 120 may accurately designate a network for registration and be registered in the designated network. Accordingly, registration in a wrong wireless network due to confusion with wireless networks constructed in neighboring houses may be prevented. This is highly efficient in a ZigBee method of using a high wavelength band, in particular, of a 2.4 GHz band.

Figure 4:
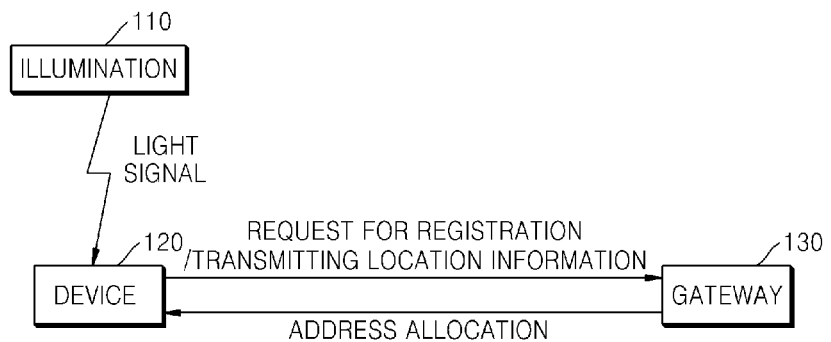
FIG. 4 illustrates signal flow in a wireless network system, according to an embodiment of the present disclosure.
Figure 5:
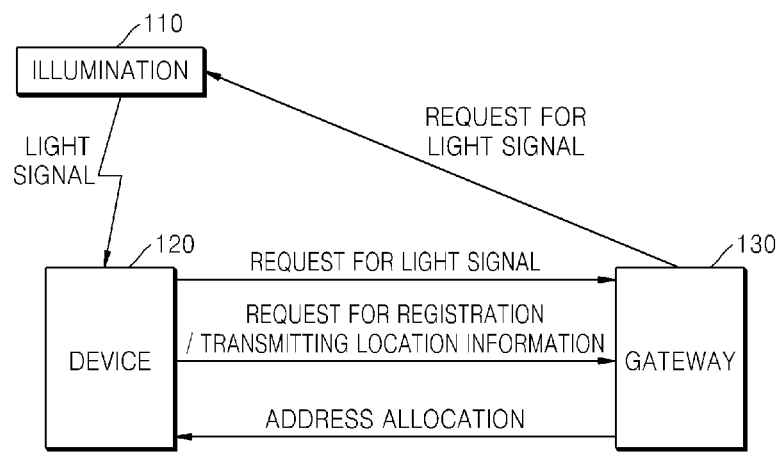
FIG. 5 illustrates signal flow in a wireless network system, according to another embodiment of the present disclosure.

FIG. 4 illustrates signal flow in a wireless network system, according to an embodiment of the present disclosure, and FIG. 5 illustrates signal flow in a wireless network system, according to another embodiment of the present disclosure. An illumination device 110 may not always transmit a light signal. For example, the illumination device 110 does not generally operate during the daytime. In addition, if the illumination device 110 always transmits the light signal while operating, power may be consumed and efficiency of illumination may deteriorate due to the light signal being generated even at times when the light signal is not necessary. To solve this problem, a method of transmitting the light signal only according to a request for the light signal will now be explained. In the embodiment of FIG. 4, a light signal is always transmitted while the illumination device 110 is operating. In the embodiment of FIG. 5, a light signal is transmitted only according to a request for the light signal.

Referring to FIG. 4, the illumination device 110 always transmits the light signal without any additional request. The device 120 that received the light signal requests registration to a gateway 130. If the gateway 130 receives the request for registration, the gateway 130 allocates an address to the wireless device 120. Upon completion of registration in a wireless network, the wireless device 120 sends location information included in the received light signal to a wireless network.

On the contrary, referring to FIG. 5, the illumination device 110 does not transmit a light signal when there is no additional request. The wireless device 120 transmits a signal to request a light signal to the gateway 130 to obtain information for registration in a wireless network. The gateway 130 that received the signal transmits the signal for requesting the light signal to the illumination device 110. The illumination device 110 that received the signal for requesting the light signal transmits the light signal. Operations performed thereafter are the same as the operations performed after the wireless device 120 receives the light signal as illustrated in FIG. 4. As such, the illumination device 110 transmits the light signal only when the illumination device 110 receives the signal for requesting the light signal from the wireless device 120, thereby preventing an unnecessary light signal from being transmitted. The illumination device 110 may transmit the light signal temporarily according to the request for the light signal, even when the illumination device 110 is not operating. Communication between the gateway 130 and the illumination device 110 transmitting the request for the light signal may use any wired or wireless communication methods, and in particular, may use a power line communication method of sending a signal through a power line connected to the illumination device 110.

Figure 6:
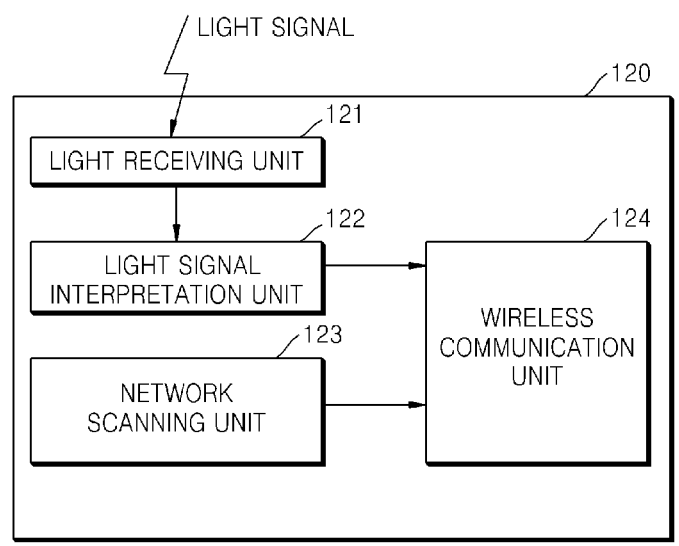
FIG. 6 is a block diagram of a wireless device, according to an embodiment of the present disclosure.

FIG. 6 is a block diagram of the wireless device 120, according to an embodiment of the present disclosure. Referring to FIG. 6, the wireless device 120 of the present embodiment may include a light receiving unit 121, a light signal interpretation unit 122, a network scanning unit 123, and a wireless communication unit 124. The light receiving unit 121 may receive a light signal and include a light sensor. The light signal interpretation unit 122 may interpret information included in the received light signal. That is, the light signal interpreting unit 122 interprets the received light signal to obtain network identification information or location information included in the received light signal. The network scanning unit 123 searches for wireless networks which are connectible to the wireless device 120. If there is a wireless network corresponding to the network identification information obtained by interpreting the light signal by the light signal interpretation unit 122 among the scanned wireless networks, the wireless communication unit 124 may request registration in the corresponding wireless network. In addition, if the wireless device 120 is registered in the wireless network, the wireless communication unit 124 may send the location information obtained by interpreting the light signal to the corresponding wireless network. The wireless communication unit 124 may also request a wireless network system to transmit the light signal.

Figure 7:
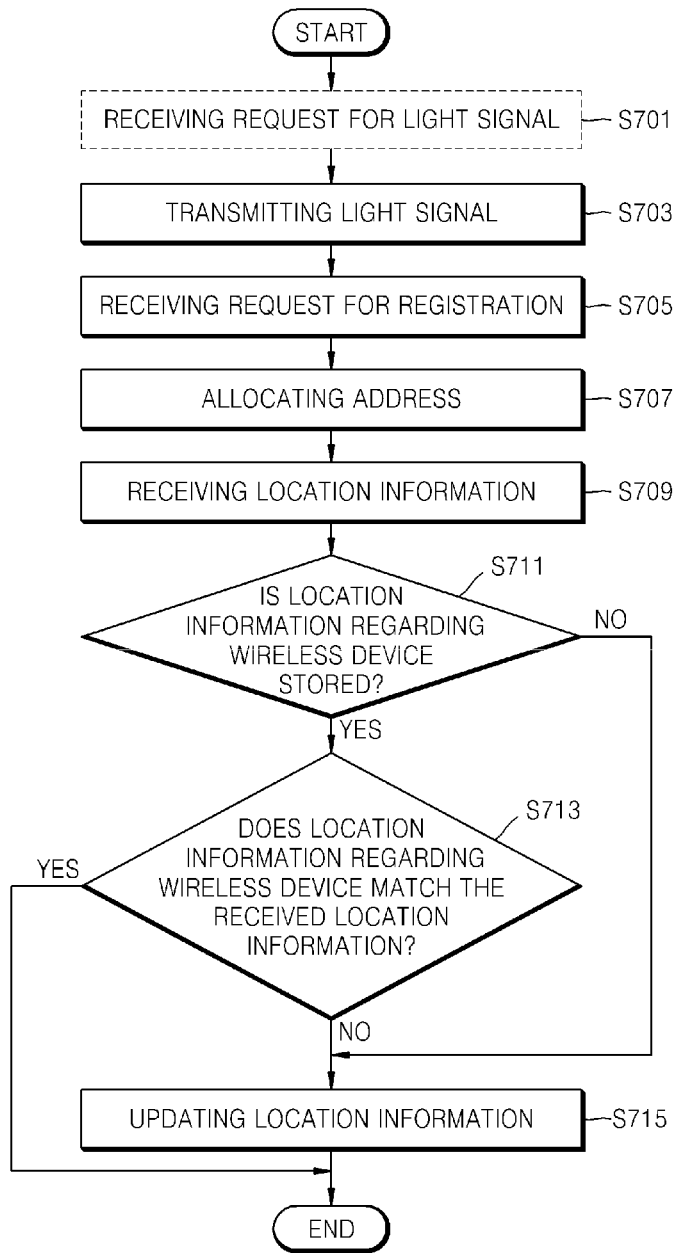
FIG. 7 is a flowchart illustrating a registration method performed by a wireless network system, according to an embodiment of the present disclosure.

FIG. 7 is a flowchart illustrating a registration method of a wireless network system, according to an embodiment of the present disclosure. Particularly, FIG. 7 is a flowchart of the registration method performed by the wireless network system according to an embodiment of the present disclosure. Referring to FIG. 7, in operation S710, the registration method of the wireless network system may start with receiving a request for a light signal. The receiving of the request for the light signal may be omitted as occasion demands, as described with reference to FIGS. 4 and 5. In operation S703, when the wireless network system receives the request for the light signal, the wireless network system transmits the light signal including network identification information and location information to a wireless device. Then, in operation S705, the wireless network system receives a request for registration to a wireless network from the wireless device which has received the light signal. In operation S707, the wireless network system completes the registration of the wireless device by allocating an address to the corresponding wireless device. In operation S709, the wireless network system receives location information from the wireless device of which registration is completed. Then, in operation S711, the wireless network system determines whether the location information of the wireless device is stored in the wireless network system. If the location information is not stored in the wireless network system, in operation S715, the wireless network system performs a location information updating operation that stores the received location information as location information regarding the wireless device. On the contrary, if the location information of the wireless device is already stored in the wireless network system, the wireless network system proceeds to operation S713 to determine whether the stored location information of the wireless device is identical to the received location information. If the stored location information of the wireless device is identical to the received location information, the operations end. If the stored location information of the wireless device is not identical to the received location information, the wireless network system performs the location information updating operation (S715) to store the received location information as new location information of the wireless device. As such, location information of the wireless device is checked and updated each time the wireless device is registered to the wireless network, and thus exact location information may be obtained without additionally correcting location information even when the wireless device is moved and newly installed in premises.

Figure 8:
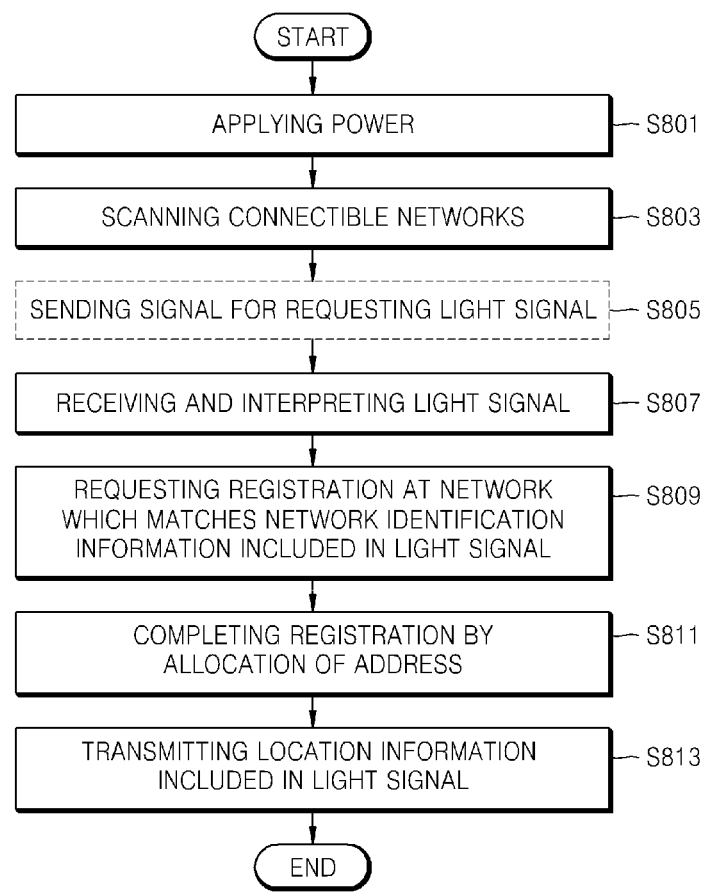
FIG. 8 is a flowchart illustrating a registration method performed by a wireless network system, according to another embodiment of the present disclosure.

FIG. 8 is a flow chart illustrating a registration method of a wireless network system, according to another embodiment of the present disclosure. In particular, FIG. 8 is a flowchart of the registration method performed by a device according to another embodiment of the present disclosure. Referring to FIG. 8, in operation S801, the registration method of the wireless network system may start with applying power to the wireless device. When power is applied to the wireless device, the wireless device automatically scans connectible wireless networks in operation S803. In order to determine a wireless network to be registered from among the wireless networks scanned in operation S803, network identification information regarding the wireless network to be registered is necessary. Accordingly, in operation S805, the wireless device may send a signal for requesting a light signal including the network identification information, in order to obtain the network identification information. The operation of sending the signal for requesting the light signal may be omitted as occasion demands, as described with reference to FIGS. 4 and 5. When the light signal is transmitted in response to the signal for requesting the light signal, the wireless device receives the transmitted light signal and interprets information included in the transmitted light signal, in operation S807. The wireless device may obtain the network identification information and location information, as a result of interpreting the transmitted light signal. Then, the wireless device determines whether there is a wireless network identical to the network identification information obtained by interpreting the light signal, from among the connectible wireless networks scanned in operation S803. If there is a wireless network identical to the network identification information, the wireless device requests registration to the corresponding wireless network in operation S809. In operation S811, the registration of the wireless device to the corresponding wireless network is completed by allocating an address to the wireless device from the wireless network system of which registration is requested. In operation S813, upon completion of the registration, the wireless device may send the location information obtained by interpreting the received light signal to the connected wireless network.

As described above, each device receives a light signal including network identification information and automatically requests connection to a wireless network, and thus the devices can be easily registered in the wireless network by applying power to each device without an additional registration procedure. Furthermore, location information of the devices can be automatically transmitted to the wireless network. If locations of the devices are changed, the changed location information can be transmitted to the wireless network. Accordingly, the devices connected to the wireless network can be easily and efficiently managed.

While this disclosure has been particularly shown and described with reference to exemplary embodiments thereof, it will be understood by those of ordinary skill in the art that various changes in form and details may be made therein without departing from the spirit and scope of the disclosure as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of registering a wireless device located in premises in a wireless network which is constructed in the premises, the method comprising:
   receiving a light signal including network identification information of the wireless network constructed in the premises from at least one illumination device configured to illuminate the premises; and
   registering the wireless device in the wireless network constructed in the premises, by using the network identification information included in the received light signal.

2. The method of claim 1, further comprising scanning at least one wireless network which is usable at a current location of the wireless device,
   wherein the registering of the wireless device in the wireless network comprises registering the wireless device in a wireless network, which corresponds to network identification information included in the received light signal, from among the scanned wireless networks.

3. The method of claim 1, wherein the received light signal includes location information of the illumination device transmitting the light signal, and
   wherein if the registering of the wireless device in the wireless network is completed, the wireless device transmits the location information included in the light signal to the wireless network.

4. The method of claim 1, wherein the receiving of the light signal comprises:
   sending a request for a light signal to at least one illumination device installed in the premises and,
   according to the request for a light signal, receiving the light signal transmitted from the illumination device.

5. A wireless device to be registered in a wireless network which is constructed in premises, the wireless device comprising:
   a light receiving unit to receive a light signal transmitted from at least one illumination device configured to illuminate the premises;
   a light signal interpretation unit to obtain network identification information of the wireless network constructed in the premises by interpreting the received light signal; and
   a wireless communication unit to register the wireless device in the wireless network constructed in the premises, by using the network identification information obtained by the light signal interpretation unit.

6. The wireless device of claim 5, further comprising a network scanning unit to scan at least one wireless network which is usable at a current location of the wireless device,
   wherein the wireless communication unit registers the wireless device in a wireless network, which corresponds to the network identification information obtained from the light signal interpretation unit, from among wireless networks scanned by the network scanning unit.

7. The wireless device of claim 5, wherein the light signal interpretation unit obtains location information of an illumination device which has transmitted the light signal, by interpreting the received light signal, and
   wherein the wireless communication unit transmits location information of the illumination device to the wireless network in which the wireless device is registered.

8. The wireless device of claim 5, wherein the wireless communication unit requests a light signal to at least one illumination device installed in the premises.

* * * * *